United States Patent [19]

Bonomi et al.

[11] Patent Number: 4,955,119
[45] Date of Patent: Sep. 11, 1990

[54] MULTI-TASK END EFFECTOR FOR ROBOTIC MACHINING CENTER

[75] Inventors: Giovanni B. Bonomi; Battistino Oldani, both of Rockford, Ill.

[73] Assignee: Imta, Rockford, Ill.

[21] Appl. No.: 378,019

[22] Filed: Jul. 11, 1989

[51] Int. Cl.⁵ .................................. B23B 29/00
[52] U.S. Cl. .............................. 29/50; 29/243.54; 29/26 A; 29/525.2; 29/34 B; 227/58; 227/69; 227/70; 901/41
[58] Field of Search .............. 29/50, 52, 53, 55, 54, 29/243.53, 243.54, 34 B, 40, 36, 525.2, 703, 704, 26 A; 408/36–40, 3; 227/51, 61, 62, 69, 70, 5–7, 11, 14; 901/41, 6, 7

[56] References Cited

U.S. PATENT DOCUMENTS

| 3,747,194 | 7/1973 | Christensen | 29/243.54 |
| 4,180,195 | 12/1979 | Caley et al. | 227/69 X |
| 4,220,275 | 9/1980 | Hametner et al. | 227/69 X |
| 4,515,302 | 5/1985 | Davern et al. | 227/51 X |
| 4,578,846 | 4/1986 | Schott et al. | 29/34 B |
| 4,645,112 | 2/1987 | Davern et al. | 227/51 X |
| 4,662,556 | 5/1987 | Gidlund | 227/51 X |
| 4,664,588 | 5/1987 | Newell et al. | 901/41 X |
| 4,676,422 | 6/1987 | Gidlund et al. | 227/51 |
| 4,759,109 | 7/1988 | Mason et al. | 29/243.54 |
| 4,762,261 | 8/1988 | Hawly et al. | 29/243.53 X |
| 4,815,193 | 3/1989 | Gutnik | 227/61 X |
| 4,854,491 | 8/1989 | Stoewer | 227/58 |
| 4,858,289 | 8/1989 | Speller, Sr. | 227/61 X |
| 4,864,702 | 9/1989 | Speller, Sr. et al. | 29/243.54 X |
| 4,885,836 | 12/1989 | Bonomi et al. | 29/34 B X |
| 4,919,321 | 4/1990 | Rydstrom et al. | 227/51 X |

FOREIGN PATENT DOCUMENTS

452651  11/1948  Canada ........................ 29/243.54

Primary Examiner—Z. R. Bilinsky
Assistant Examiner—Robert Schultz
Attorney, Agent, or Firm—McCaleb, Lucas & Brugman

[57] ABSTRACT

A multiple-task end effector attachment for the articulated head of a computer controlled robotic machining center capable of imparting multi-axis linear and rotational movements to the end effector which comprises opposingly aligned master and slave related tool heads that carry multiple tool drivers receptive of selectively changeable tooling. The tool heads are interjoined and rigidly supported in opposing alignment on opposite sides of fixture held stationary work pieces by means of an intervening generally U-shaped yoke or frame of selected configuration dedicated to the particular shape of the parts assembly. The master tool head of the end effector is connected directly to and carried by the mobile head of the robot which powers and controls the positioning and operation of both tool heads of the end effector. The tool heads operationally cooperate in slave relationship to clamp the parts therebetween and form and prepare holes through the work pieces at predetermined locations followed by the installation of selected fasteners such as rivets, bolts and the like. This arrangement enables a single robot to operate multiple tool heads on opposite sides of stationary work pieces.

11 Claims, 9 Drawing Sheets

MULTI-TASK END EFFECTOR FOR ROBOTIC MACHINING CENTER

This invention relates generally to the fastening art and more particularly to improvements in tooling attachments useful with robotic machining centers for the purpose of automating the assembly and integration of parts by means of rivets or similar fasteners.

Under modern day manufacturing technology, computer controlled high speed mobile machining centers or "robots", equipped with one or more drive spindles capable of selected spacial positioning and adapted to receive various machine tools, have gained popular acceptance for carrying out a variety of automatic machining operations.

In certain limited instances, such robots have been adapted to riveting procedures wherein a single robot working over one side of fixture held work pieces performs the successive functions of hole preparation, rivet insertion and installation at each rivet location before proceeding to the next rivet location. So far this application of robotic rivet installation has been limited to the installation of blind rivets.

In a prior U.S. application Ser. No. 07/183,697, filed July 7, 1988, now U.S. Pat. No. 4,885,836, issued Dec. 12, 1989 and owned by the assignee hereof, apparatus for automatically carrying out riveting procedures utilizing two robots working in mirror relationship on opposite sides of fixture held assembly parts is disclosed. In the riveting procedure described therein the robots first prepare all rivet holes at successive locations and thereafter return to each such location for insertion and installation of rivets or other type of fasteners.

BRIEF SUMMARY OF INVENTION

The present invention constitutes an improvement over prior known robotic fastener tooling applications and procedures in that it presents a single end effector attachment for the mobile working head of a robot which adapts a single robotic machining center to drive a pair of cooperating spaced tool heads. In accordance with this invention a pair of tool heads, operationally disposed on opposite sides of fixture held parts to be assembled are maintained in aligned relationship so that they may work in tandem to accomplish hole preparation, fastener insertion and installation operations at selected locations of the parts to be assembled. In a preferred form of the end effector, two tool heads are interconnected by a generally U-shaped yoke or frame and are so arranged that the tooling carried thereby serves to tightly clamp the assembly parts at each hole location without overstressing the parts and the fixture holding the same. Each tool head preferably carries multiple tool drivers, each acceptable of selected tools for hole preparation and fastener installation, such as drills, hammers, bucking bars, deburring and reaming tools and the like. Since the tool drivers are adapted to accept a multiplicity of various tooling, this invention provides a highly flexible capability for installing a variety of fasteners, such as solid metal rivets, lock bolts, both pull and stump type, and the like at each hole location. The tooling arrangement is such that each hole may be formed and prepared for fastener installation and the latter function carried out at each position of the end effector. Alternatively all holes to be formed in the assembly parts may be prepared in succession and the robotically controlled end effector and tool heads subsequently relocated opposite each preceding hole for subsequent installation of the selected fasteners.

It is a particular object of this invention to provide an improved end effector attachment for the mobile head of a robotic machining center.

Another important object of this invention is to provide an improved end effector for use with the mobile head of a robot which presents two aligned spaced tool heads, operable on opposite sides of assembly parts, each of which carries one or more tool driving means.

Still another important object of this invention is to provide a new and improved end effector for the mobile head of a robot which provides a pair of separated tool heads powered and controlled by the robot and capable of working on opposite sides or faces of intervening work piece with the spaced tool heads being capable of performing independent and simultaneous operations.

Another important object of this invention is to provide an improved end effector attachable to the working head of a computer controlled robot which permits a single robot to carry out selected operations on opposite sides of stationary work pieces to be assembled.

Still another object of this invention is to provide an improved end effector for attachment to the working head of a computer controlled robot which provides a pair of spaced coaxially aligned tool heads, each having a multiplicity of selectively positioned tool drivers for operating selected tooling.

Another important object of this invention is to provide an end effector of the order set out in the immediately preceding object which is attachable to the working head of a single robot and is capable of driving and managing spaced tool heads carried by an intervening frame; each tool head having a multiplicity of individual tool drivers and means for selectively positioning the same.

Having described this invention, the above and further objects, features and advantages thereof will be apparent to those of skill in the art from the following detailed description of a preferred embodiment of the invention illustrated in the accompanying drawings and representing the best mode presently contemplated for enabling those of skill in the art to carry out and practice this invention.

DESCRIPTION OF THE PREFERRED EMBODIMENT

Before describing the details of the improved end effector according to this invention, initial consideration will be given to the general characteristics of a preferred working environment in which to practice this invention.

It is to be noted that the illustrative embodiments of this invention described hereinafter are related to the production and assembly of components and parts utilized in the aircraft industry in which large, relatively heavy structures of complex shape, such as wing and fuselage sections are involved. Those familiar with this art, however, will readily recognize other fields of use and application for this invention.

In general, an end effector according to this invention is best used in a work cell environment in which one or more computer controlled robotic machining centers, or robots, capable of imparting multi-axis linear and rotational movements to the end effector hereof may be employed. Typifying this environment is the work cell illustrated in FIG. 1 of the drawings which comprises a high speed machining center or robot designated $R_1$ mounted to move along a pair of parallel elongated horizontal tracks or railways 20, 20 in response to actuation of power driven rack and pinion drive means or the like (not shown). The illustrated robot $R_1$ is of Cartesian structure having linear, horizontal, vertical and transverse X, Y and Z axes of movement; the X axis being defined by the associated horizontal, linear ways 20, 20; the Y axis being defined by a central, vertical column 21 of the machine and the Z axis by a transversely related linearly moveable extensible ram 22. An articulated wrist or twist head 23 is disposed at the outer end of ram 22 and comprises a pair of transverse rotary axes A and C. Column 21 is likewise rotatable about its vertical axis to defined a third rotary axis B.

Figure 1:
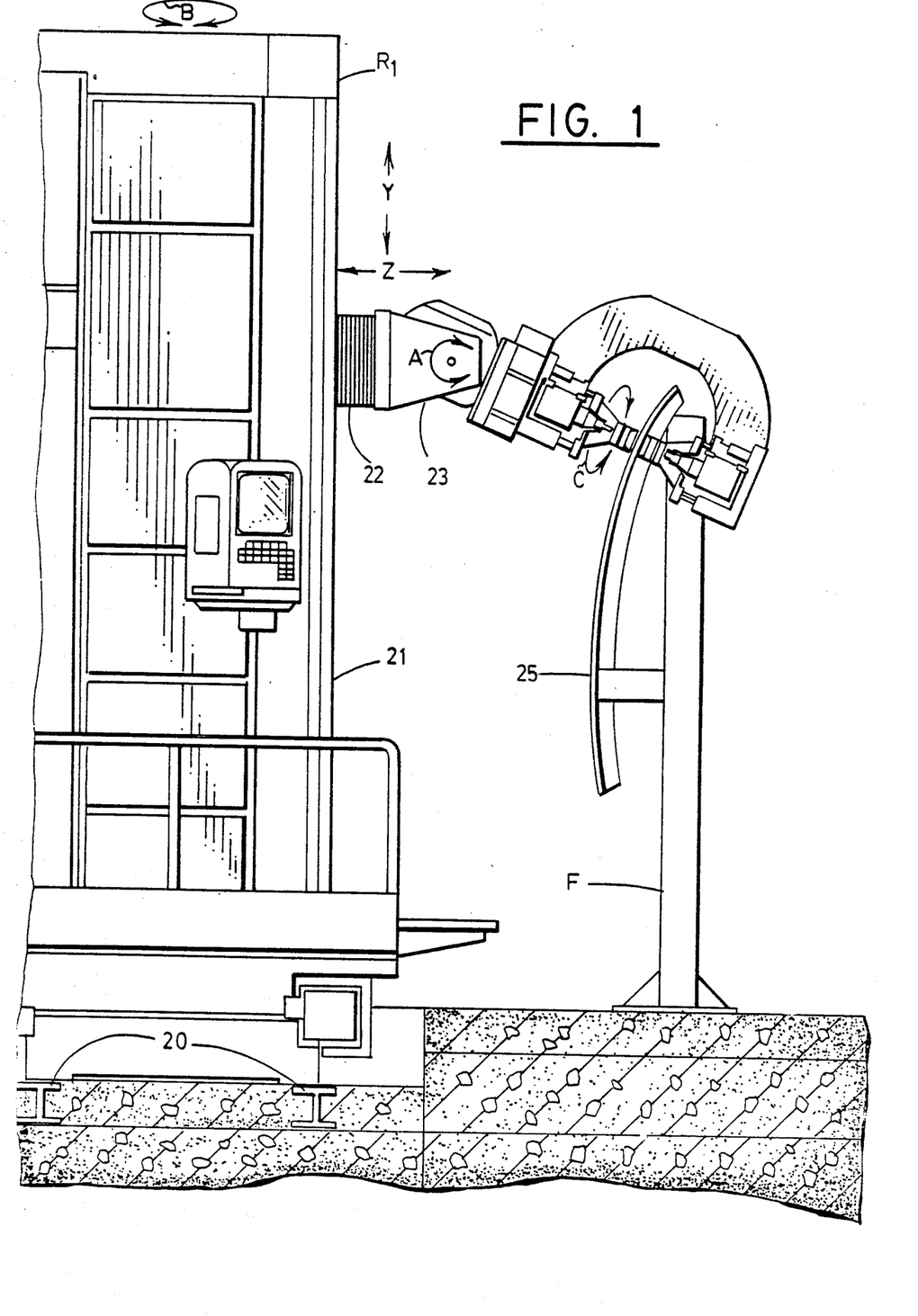
FIG. 1 is a schematic representation of a work cell and robot equipped with an end effector according to this invention.

Located opposite the robot $R_1$ is an automatic flexible or adjustable fixture (F) for holding the assembly of parts and components, such as wing panels and ribs, indicated generally at 25 in FIG. 1. Fixture (F) preferably is mounted parallel to the X axis of robot $R_1$.

The twist head 23 normally has a rotatable machining spindle designed to carry working tools via tapered connections (not shown), but which is not used with the end effector hereof. The robot embodies various power supplies and specific performance features required for machine operations to be performed in the cell.

The robot may be equipped with a stationary rivet feed station and automatic magazines for storing various end effectors attachable to its head 23. If such a stationary arrangement is used the same may be located conveniently at one or both ends of the robot's X axis of movement. Alternatively, mobile magazines of the order taught in U.S. Pat. No. 4,344,221 of Aug. 17, 1982, for example, may be employed to resupply tools, end effectors and fasteners to the robot in accordance with the computer controlled requirements for a particular assembly.

Figure 2:
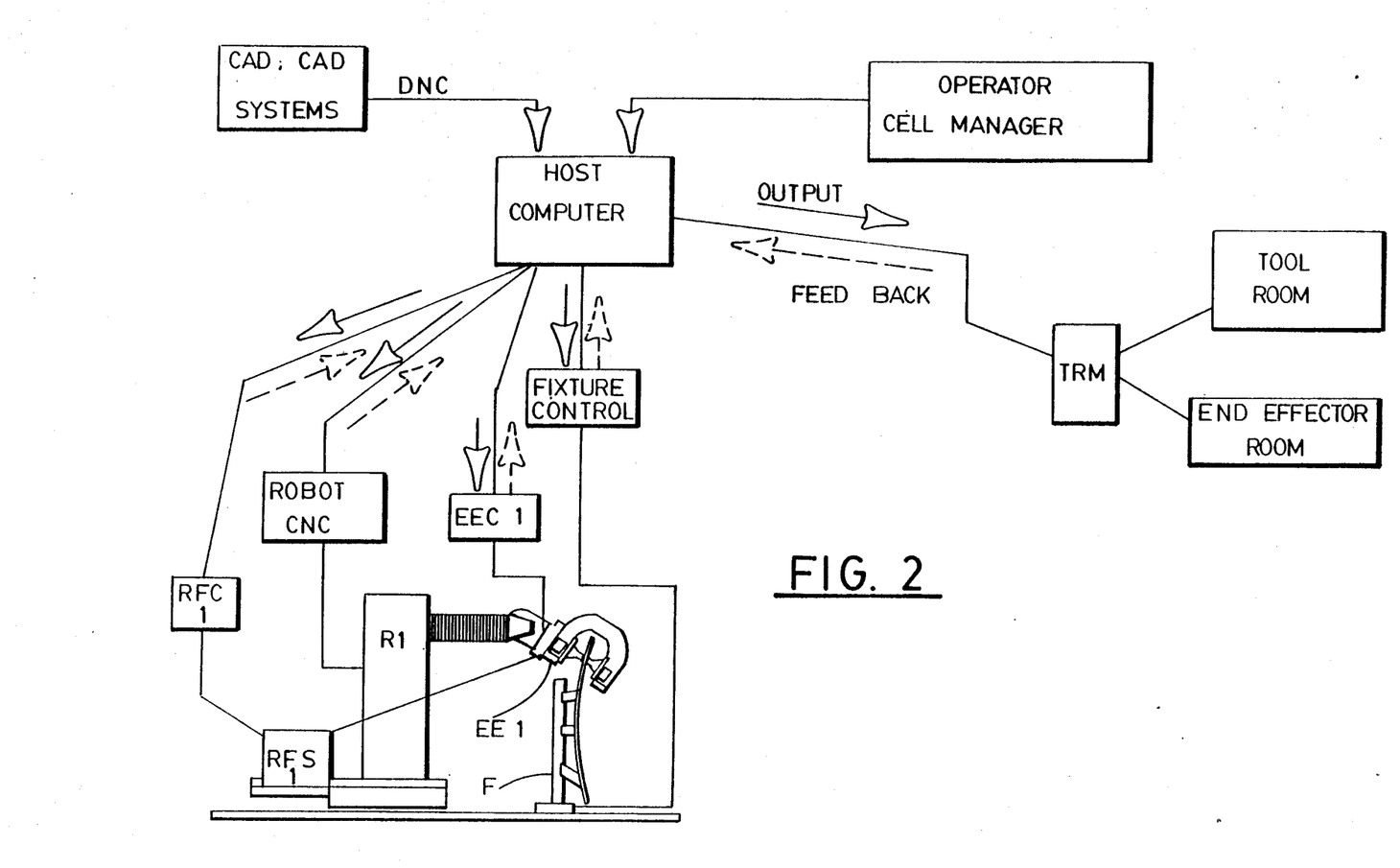
FIG. 2 is a schematic illustration of a computer control system for the work cell and robot of FIG. 1.

As indicated in FIG. 2, the work cell is importantly controlled by a host computer which receives computer aided manufacturing (CAD/CAM) instructions, via direct numeric control (DNC) or other means as well as operator controlled instructions which determine and or modify the design of the end assembly. All output signals are sent from the host computer to pertinent lower level computers in direct command control of the robot. As the instructions are performed, feedback signals are returned by the sub-level computers to the host computer.

By way of illustration, the host computer instructs the tool room management computer (TRM) which determines the selection and supply of tools and end effectors to enable the robot to find and acquire the required tools or end effector in correct pick-up positions. The tool room computer (TRM) also updates the use history and other data files for each end effector and tool. When mobile magazines are used then the TRM computer controls the management thereof as well.

Rivet feed computers (RFC) control the rivet feed stations (RFS), for selecting and controlling the exact type of fastener to be sent to the end effector's fastening tools during the fastening operation.

A continuous numeric control computer (CNC) feeds appropriate signals to the robot $R_1$ to move the same on its axes whereby to position the tools and end effector correctly inside of the work envelope.

The end effector control computer (EEC), on receipt of a start signal command, manages the appropriate sequence of movements of the robot and end effector operation including hole preparation, clamping, inspection, inserting and upsetting of the fasteners as well as other desired operations.

A fixture control computer positions all clamps of the fixture (F) according to the geometry of the parts to be assembled and also controls fixture configuration used for and during a particular assembly.

Robotic machine tool centers capable of carrying out the above and other tasks required by this invention are commercially available, such as an upright robotic machining center of the order illustrated in FIG. 1 or a gantry type; both types of machining centers being marketed by JOBS, Piacenza, Italy, under the name Job Mach among others.

While there are other commercial sources of machining centers capable of meeting the requirements of this invention, it is necessary that the selected robot be of rigid construction and have a capability of high accuracy in positioning the working tools. Among other features, such a machine tool center must be capable of employing different types of tool holding spindles and drivers for machining different materials, such as low RPM and high torque spindles for hard materials and high RPM spindles for composite materials. A capability of automatically changing tools and end effectors for automated and unmanned installations in conjunction with computer controls, such as the described system illustrated in FIG. 2 of the drawings, is also desirable. In the usual instance the selected robot must be capable of drilling, reaming, countersinking, milling, routing, net trimming, impacting and other machining as well as measuring and inspection operations, while rigidly supporting a variety of end effectors and, in this instance, the end effector of this invention.

In conjunction with the aforenoted features, the selected robot should be equipped with a probe which finds the exact location of the work pieces. If this position differs from the theoretical program position, it should produce accommodating alterations of the host computer program to adjust to the new position in order to avoid the necessity of locating the work pieces in a precise theoretical position as preconceived by the computer program.

In a similar vein, part adjustment capability of the robot is also required in order to adjust the part program according to the geometrical characteristics of the parts where these may differ from theoretical characteristics. Thus, if a drilling operation is required in the middle of two assigned points, the machine must automatically locate such points and calculate what the position of the required hole should be and thereafter perform the necessary operation at a new substitute position.

Thermal variations in working environment also may cause dimensional variations in the work pieces and structure of the machine. Thus the robot should be capable of compensating for these and other variations by modifying the part program accordingly.

In any event, regardless of the particular robot selected it is essential that the same provide a rigid support for the end effector of this invention, as well as the appropriate pneumatic, hydraulic and electrical power supplies necessary for driving the tooling carried by the end effector for the purpose of installing fasteners or performing other operations in the fixture held assembly parts.

Turning now to the features of the illustrated preferred embodiment of the present invention, specific reference is made to FIGS. 3–7 of the drawings.

Figure 3:
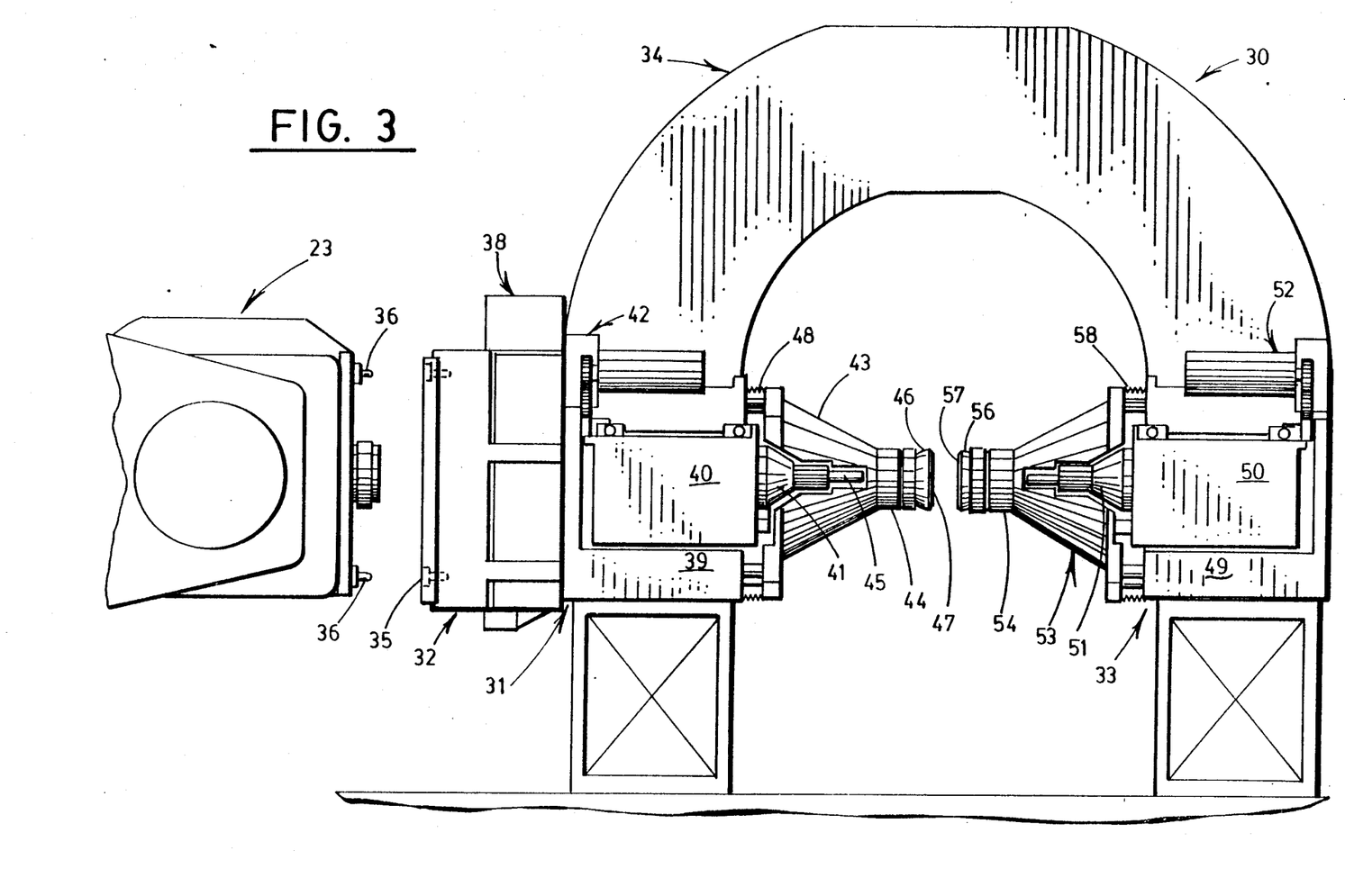
FIG. 3 is a front elevation of an end effector of this invention positioned for interconnection with a robot.

As shown in FIG. 3 an end effector in accordance with this invention, indicated generally at 30, comprises a master head 31 with attached interface bell 32 and a slave head 33. The two heads 31 an 33 are aligned coaxially in opposing spaced relationship and are interjoined by an intervening substantially inverted U-shaped yoke 34 which, while hollow, is of rigid construction, preferably made of light weight material such as cast aluminum or the like.

In FIG. 3 of the drawings end effector 30 is shown positioned on pedestals or like under supports in position for automatic engagement with the twist head 23 of the robot. For this purpose the interface bell 32 comprises a face plate 35 for connection with the twist head by means of an automatic coupling system which includes plural guide/locking pins 36, 36 that lock-up with plate means 35 according to known practice.

The interface bell 32 in addition to the locking system for cooperation with the twist head of the robot, also comprises a power console section 38 which automatically interconnects with appropriate pneumatic, hydraulic and electrical power connections associated with the robot.

Adjoining the interface bell is a main body 39 of the master head 31 which supports a first shuttle means 40, a plurality of tool drivers 41 and drive means 42 for translating the shuttle 40 laterally of the head 31 for purposes of aligning selected drivers 41 coaxially of a nose piece 43.

The nose piece as shown herein is of general frusto-conical formation having an extending hollow cylindrical foot bush section 44 at its apex end through which tools 45 carried by a driver 41 are moved in operation. The outer end of the foot bush 44 carries a swivel mounted contact piece 46 which, within limits, can conform to the plane of contact with a work piece. A pressure responsive sensor 47 is mounted at the outer end of contact piece 46 for signaling the robot when contact has been made with the skin or surface of an opposing work piece, preliminary to initiation of a working operation. It will be noted that the nose piece 43 is coupled to the main body of the head 31 in a manner to be described presently. Preferably intervening flexible dust bellows 48 are employed between the nose piece and body of head 31 to prevent the entry of dust, chips and like impurities into the interior of the nose piece.

The slave head 33 is substantially a duplicate of the master head 31 with the exception that it does not include the interface bell 32 or power console 38. Consequently further detailed description thereof is not deemed necessary herein.

Briefly, however, slave head 33 includes a main a body 49, shuttle means 50 for carrying plural tool drivers 51, drive means 52 for driving the shuttle; and a nose piece 53 with foot bush 54, contact piece 56 and sensor 57. A dust cover or bellows 58 preferably extends between nose piece 53 and body 49 of the slave head.

It should be noted that it is fully contemplated that the shuttles 40 and 50 may move vertically with equal facility as opposed to the herein illustrated embodiment, if desired.

The yoke 34, as illustrated herein, comprises a substantially inverted U-shaped support member formed preferably as a rigid fabricated or cast structure of light weight material, such as aluminum or magnesium steel, and is appropriately hollow to carry required power supplies to the slave head 33. It is to be understood that while the yoke 34 is herein illustrated to be of generally symmetrical configuration, the particular shape of the yoke may be widely varied and custom fit to dedicate it to the shape of a particular assembly encountered by the end effector 30. For example, the throat of the illustrated yoke assembly 34 can be considerably elongated from that illustrated to accommodate positioning of the two working heads 31 and 33 over a greater work area of the assembled parts. In a like manner, the inverted U configuration may be asymmetrical with the downwardly extending arms of the U being curved, inclined or custom shaped to accommodate the particular shape of the parts assembly. Other configurations will be apparent to those with skill in this art.

Figure 4:
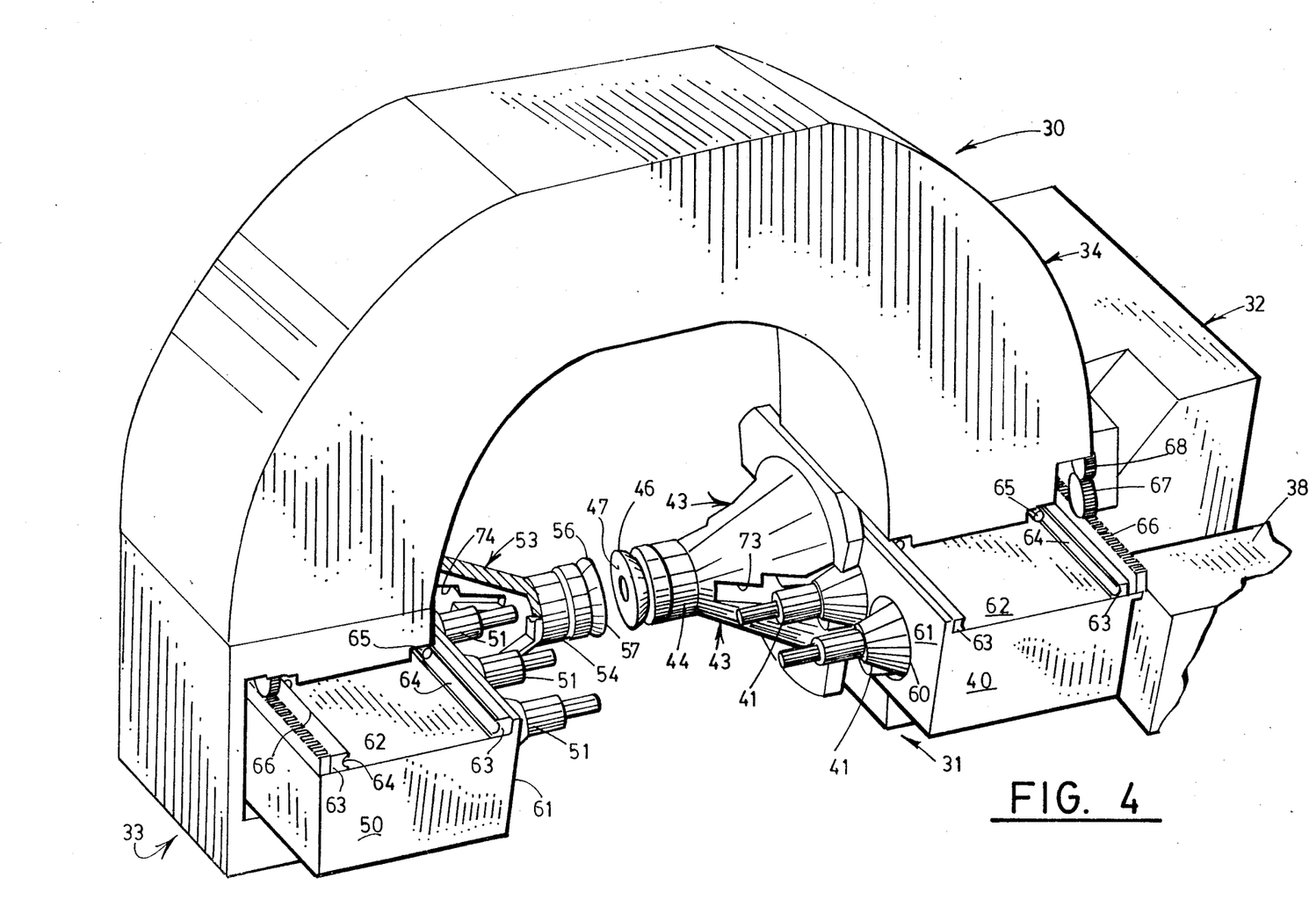
FIG. 4 is a partial perspective view of the end effector shown in FIG. 3.

With reference to FIG. 4 of the drawings the shuttles 40 and 50 associated with the master and slave heads 31 and 33, respectively, are shown in perspective and constitute substantially rectangular parallelopiped metal blocks having a plurality of cylindrical sockets 60 opening inwardly of one front face 61 thereof for slidably receiving the tool drivers 41 and 51, as the case may be. It will be noted that the drivers 41 and 51 are disposed in coaxially opposed position on opposite sides of the open throat formed by the spaced arms of the inverted U-shaped yoke 34. In addition the upper face or wall 62 of each of the shuttle members 40 and 50 is provided with parallel rails 63, 63 extending along the upper lateral margins thereof. Such rails are formed with a semi-circular depression or groove 64 receptive of race held ball bearing means 65, 65 which ride in the grooves 64 and vertically support the shuttle member in its translating movements laterally of an associated head 40 or 50. In addition to the rails 63 a rack member 66 is fastened along one upper side margin of the each of the shuttle members for engagement with a driving gear 67 engaged by motor driven pinion 68. As shown best in FIG. 5 each pinion 68 is driven by an electrical motor means 70 which is periodically energized according to the dictates of computer control signals for translating the shuttles. In this manner a selected pair of tool drivers 41 and 51 may be positioned in desired locations for interactive cooperation during the hole forming, preparation and fastener application functions.

In the particular instance illustrated herein, each of the shuttles 40 and 50 carries three drivers 41 or 51, which pass laterally through aligned cut away openings 73 and 74 in the nose pieces 43 and 53, respectively. When positioned for operation, two of the drivers 41 and 51 are aligned coaxially with their associated nose pieces 43 and 53 so that the tooling carried thereby may operate coaxially through the foot bushes 44 and 54.

Figures 5, 9:
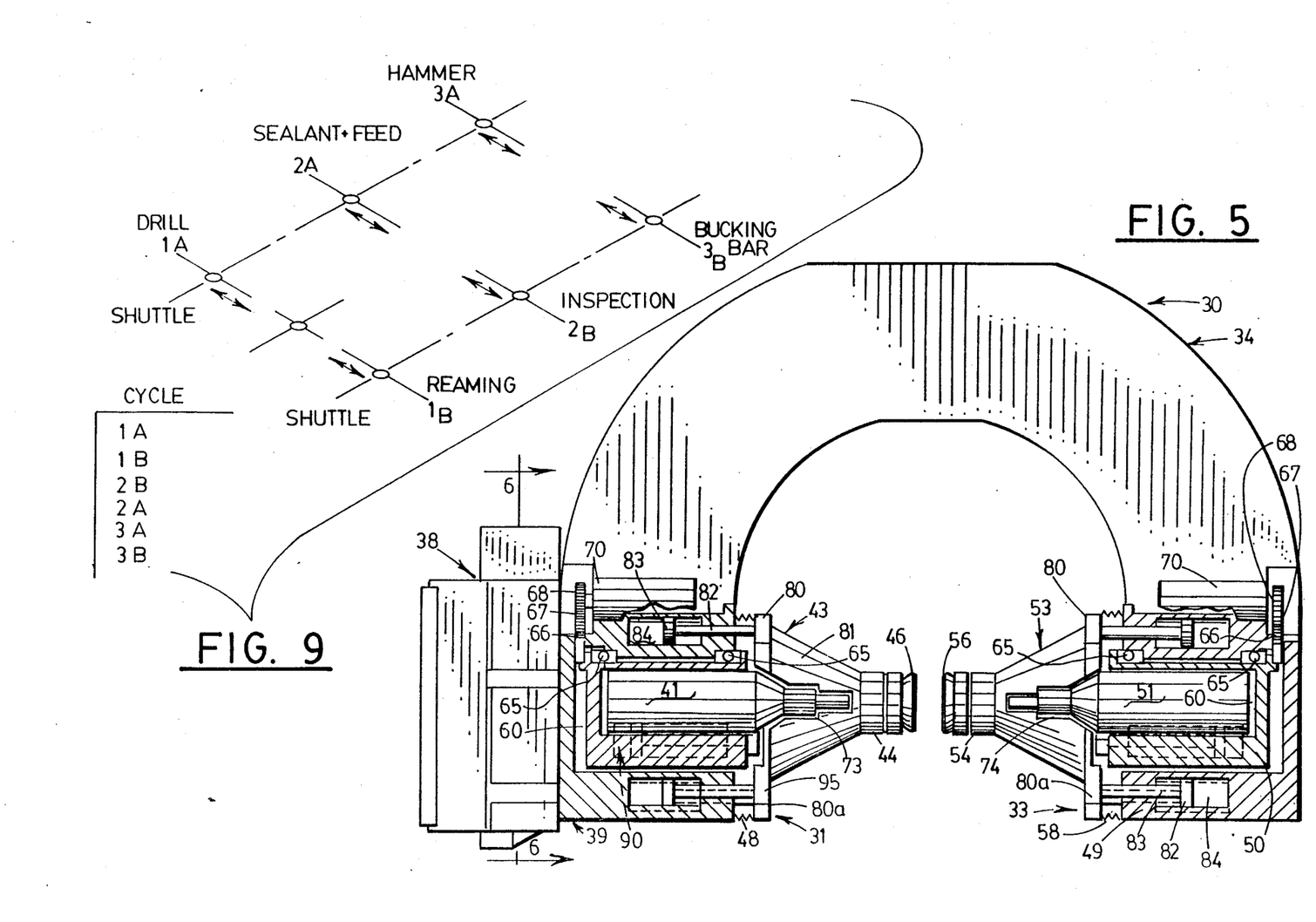
FIG. 5 is a front elevation, with parts in section, of the end effector of FIG. 3.
FIG. 9 is a schematic diagram illustrating the operational cycle of a typical arrangement of multiple tool drivers and tools in the end effector of this invention.
Figure 6:
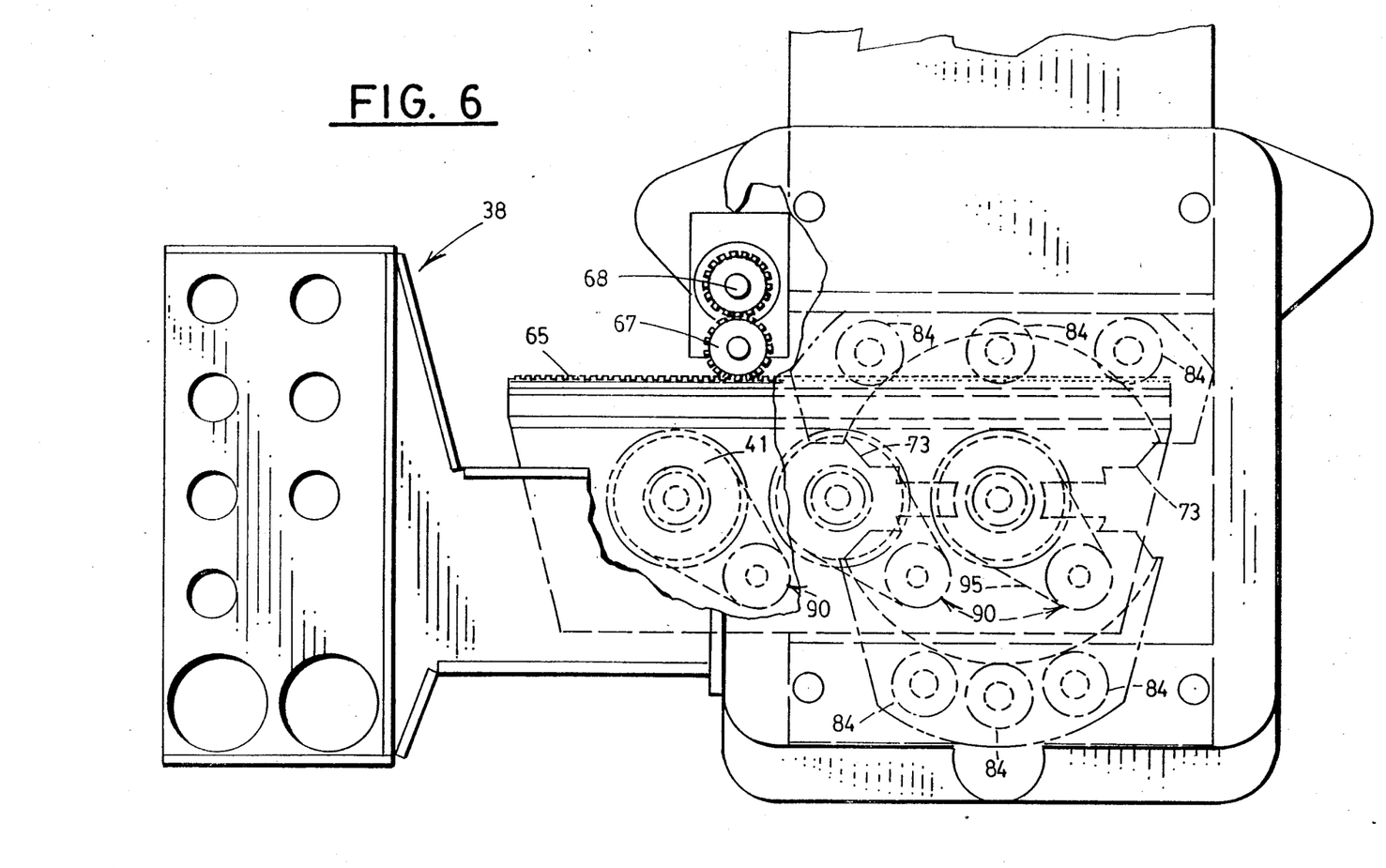
FIG. 6 is a partial enlarged end elevation thereof, taken substantially from vantage line 6—6 of FIG. 5.
Figure 7:
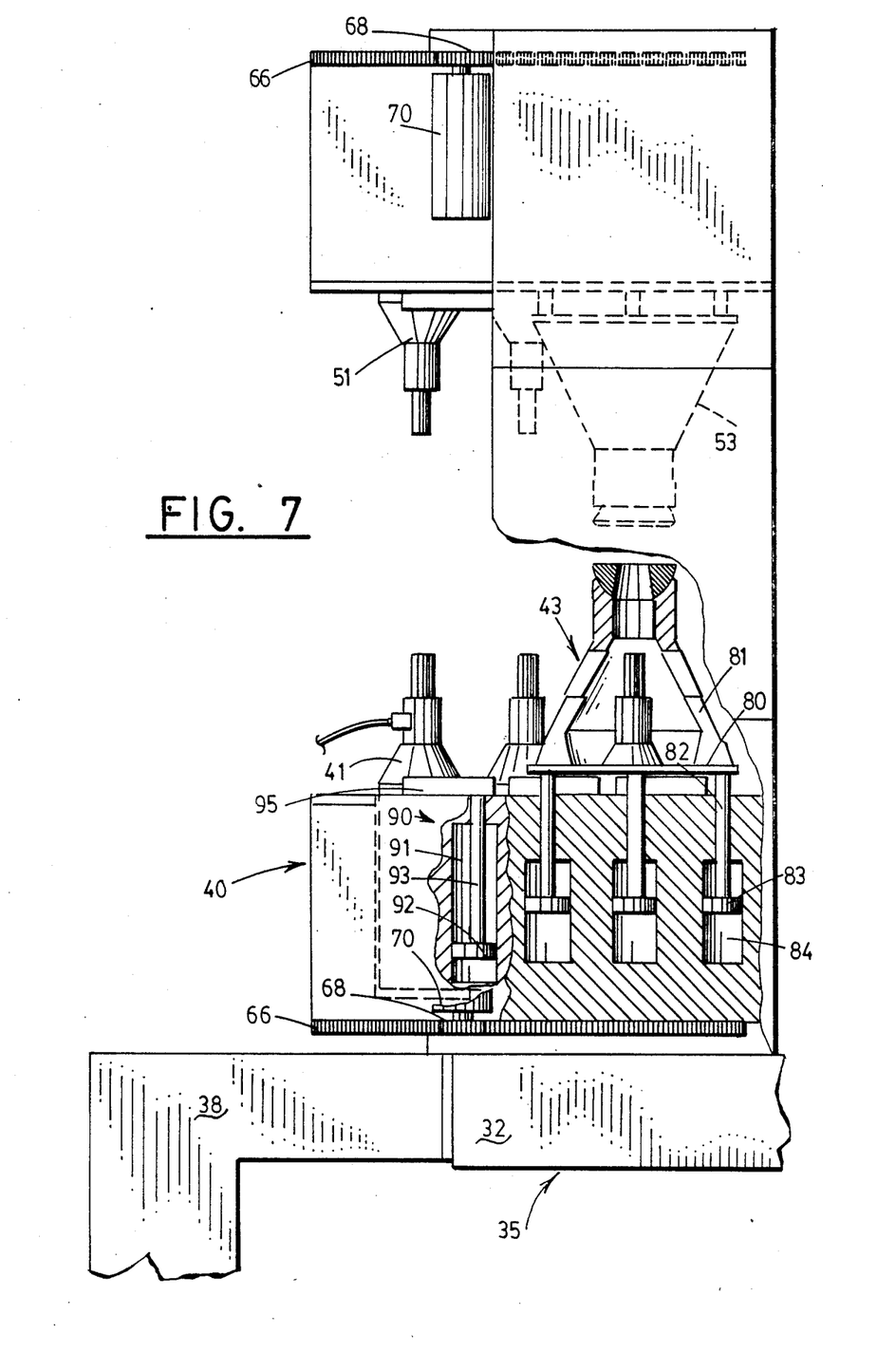
FIG. 7 is a top plan thereof with portions broken away in section.

Interconnection of the nose pieces with the main bodies of the master and slave heads will best be understood with reference to FIGS. 5–7 of the drawings. By way of illustration, the nose piece 43 associated with master head 31, for example, comprises a planar base plate 80 which is formed in two sections 80 and 80a, one above and one beneath the lateral openings 73 which permit lateral passage of the power driven tool drivers 51. (See FIG. 4 also). This bifurcated base plate, which is located at the larger or base end of the fustro conical body 81 for the nose piece 43, is positively coupled to the outer ends of the plurality of piston rods 82 extending from cylindrical pistons 83 located in suitable cylindrical piston chambers 84 formed within the body 39 of the master head. (See FIGS. 5–7). As illustrated there are a total of six such piston and cylinder actuators, three located in the upper regions of the master head body 39 and three in the lower regions thereof. It is to be noted that the cylinder and piston assemblies in each bank, that is the upper and lower banks thereof, are in coplanar alignment and that the outer end of each of the piston rods 82 is fixed, as by welding, rigidly to the base plate 80 of the nose piece.

It also will be appreciated that the nose piece attachment structure associated with the slave head nose piece 53 is identical to that described above and comprises six cylinder and piston assemblies, indicated by like numbers, as described for nose piece 43. The cylinder and piston assemblies attached to the respective nose pieces 43 and 53 are supplied with appropriate pneumatic or hydraulic fluid to drive the pistons 83 coaxially of the cylinder chambers 84 whereby to advance and retract the nose pieces 43 and 53 for purposes which will be described more fully hereinafter.

As illustrated in FIG. 7 of the drawings, the nose pieces 43 and 53 are disposed in a retracted or home position and are held there by hydraulic or pneumatic forces acting against the actuating pistons 83 therefore until it is desired to advance the nose pieces during operation of the end effector in accordance with appropriate control signals from the end effector computer. Appropriate porting and supply passageways (not shown) are provided in the bodies of the master and slave heads to activate the pistons 83 in accordance with conventional hydraulic or pneumatic practice.

In addition to the actuators for driving the nose pieces of the master and slave heads as above related, each of the heads also embodies means for advancing and retracting the tool drivers. To that end, reference is made to FIGS. 6 and 7 from which it will be recognized that the shuttle members 40 and 50 are provided with internal piston and cylinder assemblies 90 comprising cylinders 91, pistons 92 and piston rods 93 located internally of the body of the shuttle and located near the lower sides thereof. The piston rods 93 extend outwardly of the front or forward face 61 of the shuttle blocks where each is joined or fixed to one end of an actuating arm member 95 fixed to an adjacent tool driver 41 or 51 as the case may be. (See FIG. 7). Again the assemblies 90 are actuated by hydraulic or pneumatic forces fed to passageway in the shuttles by an appropriate flexible umbilical coupled to a source of such power located in the robot and transferred to the shuttle through the power console 38 as will appear presently. It will be understood that each of the actuators 41 associated with the master head, for example, is coupled to an arm 95 powered by the associated piston and cylinder assembly 90 so that movement of the piston in one direction serves to advance a tool driver 41 forwardly or toward a work piece located between the master and slave heads in operation and conversely to retract the same to a home position as illustrated in FIGS. 5 and 7 in particular. Inasmuch as there are three drivers 41 in the master head assembly, there are three such assemblies 90 associated with the master shuttle 40. In a similar fashion three drivers associated with the slave head are actuated by corresponding actuator means 90 as shown in FIG. 5 and so will not be described further herein since they are identical to the actuator assemblies associated with the master head described above.

Figure 8:
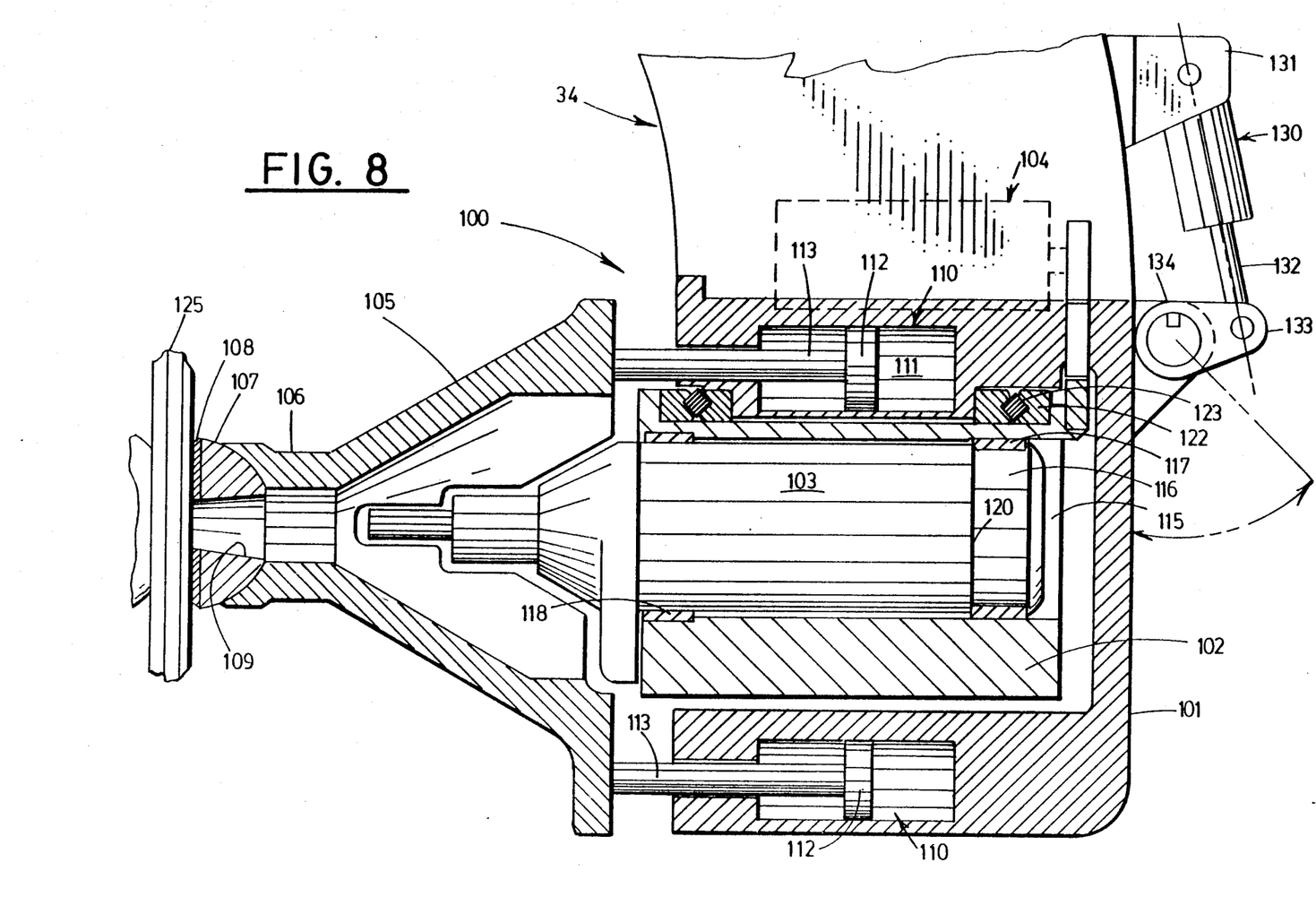
FIG. 8 is an enlarged cross-sectional view with parts in elevation of a modified end effector embodying a pivotally mounted tool head.

With reference now to FIG. 8 of the drawings, a modified slave head assembly 100 is therein illustrated, mounted at the lower end of the yoke arm. Assembly 100 comprises a main body 101 carrying a slidably moveable shuttle member 102 for housing a plurality of tool drivers 103 moveable laterally of body 101 by actuation of a motorized drive means 104, identical to the drive means 42 and 52 heretofore described and comprising a motor driven pinion, gear and rack train as before described. A frusto-conical nose piece 105 is mounted at one end of body 101 and includes a foot bush 106 and contact piece 107 with sensor 108 all as in the nose piece 53 of FIG. 3. Plural hydraulic or pneumatically powered actuator means 110 are provided, each comprising a cylinder 111, piston 112 and piston rod 113. Such assemblies are mounted within the body 101 and fixed to one end of the nose piece 105 to advance and retract the latter in the manner heretofore described.

The tool drivers 103 are mounted in cylindrical sockets 115 extending inwardly of the outer face of the shuttle member 102 and comprise a fixed body portion 116 held in bearing means 117 near the inner end of each socket 115. Secondary bearing means 118 adjacent the outer end of each socket support moveable cylindrical body 120 which moves coaxially over the fixed body portion 116 in operation. Advancing and retracting movements of the tool driver coaxially of the nose piece takes place in response to hydraulic actuator assemblies (not shown) identical to the actuator assemblies 90 heretofore described and shown in FIGS. 6 and 7 of the drawings.

Lateral movements of the shuttle member 102 are brought about by the drive means 104, as above noted. To that end the shuttle member is suspended on rails 122 attached to the upper lateral margins thereof and cooperating with, in this case, thrust bearing assemblies 123 as opposed to the roller bearing assembly 65 described heretofore in association with the shuttles 40 and 50.

The principle departure of the modified slave head assembly 100 of FIG. 8 over the slave head 33 of FIG. 4, for example, resides in the provision of means for pivotally moving the slave head relative to the yoke, as is necessary when mounting the end effector over certain fixture held parts, such as, parts assembly 125, which may require greater clearance between the master and slave heads than is possible in the fixed slave head assembly incorporated in the end effector of FIGS. 1-7 of the drawings. To this end, it will be noted that a hydraulic actuated ram assembly 130 is pivotally anchored at one end to a mounting ear 131 projecting from the outer side of the yoke 34. Moveable piston rod 132 of assembly 130 is pivotally joined to a crank arm 133 fixed, as by key means to a shaft 134 extending between rearwardly projecting supports extending from opposite sides of the yoke 34 adjacent the upper end of the slave assembly body 101. Thus, when the piston rod 132 is extended, in the manner illustrated in FIG. 8, the slave head 100 is held in its operating position against the yoke 34 as therein illustrated. On the other hand, retraction of the piston rod 132 serves to pivotally swing the slave head assembly downwardly through an arc as indicated in FIG. 8 to dispose the outer end of the nose piece in a depending state from that illustrated in FIG. 8 so that it may clear a fixture held assembly in mounting end effector thereover. Once the end effector is positioned over the work pieces 125, the slave head assembly 100 is then returned to its working position as illustrated in FIG. 8, being held in such position by the by the ram assembly 130 or a locking device.

THE USE AND OPERATION

It will be recalled that each of the master and slave heads in the herein illustrated case carry three independent tool drivers which are readily adapted for accommodating different tools for performing selected functions. By way of illustration, FIG. 9 of the drawings schematically sets forth a typical arrangement of the master and slave head tooling accommodated by the multiple drivers mounted therein. As there set forth, the functions performed by the tools carried by the master head are indicated at 1A, 2A and 3A as comprising, in this instance, a drill at 1A, a sealant applicator at 2A and a rivet setting hammer at 3A. The opposing respective tools in the slave head comprise a reaming tool at 1B, an inspection probe in driver 2B and a bucking bar in tool driver 3B. With this particular arrangement the cycle of operation as indicated in FIG. 9 is as follows: the drill in driver 1A is utilized to a form hole through the fixture held parts assembly followed by the activity of the slave head driver 1B which reams the hole formed by the drill in the driver 1A. Driver 2B is then positioned opposite the previously formed hole and an inspection probe inspects the hole for roundness and other factors, as desired. Thereafter driver 2A positioned opposite the drilled hole advances a sealant applying tool which applies sealant adjacent the hole. The rivet setting hammer in driver 3A is then disposed opposite the drilled and reamed hole and a rivet previously fed to the nose piece of the master head is then inserted into the hole and the held in place by the hammer in tool driver 3A awaiting positioning of the bucking bar held in the tool driver 3B of the slave head. Operation of the hammer and bucking bar serve to cooperatively set the rivet and fasten the parts together.

It will be understood from FIG. 9 that depending on the selection of the particular tooling held by the various drivers of the master and slave heads, a wide variety of operations may be carried out as desired for hole preparation and insertion of selected fasteners. It is further to be recognized that the present invention is not to be limited to the formation of holes and installation of fasteners, but is obviously capable of carrying out other machining operations and functions as well such as using an end mill to trim the edges or cut openings through the work pieces.

By way of further illustration of the functioning of the improved end effector of this invention for purposes of rivet setting, references is now made to the schematic illustrations of FIGS. 10-15 of the drawings which illustrate a typical rivet installation and upsetting operation.

Figure 10:
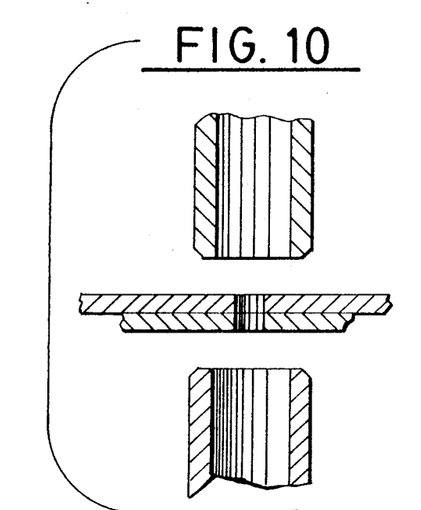
FIGS. 10–15 are partial elevations schematically depicting successive steps of installing a rivet with the end effector hereof.

FIG. 10 demonstrates hole selection and alignment of the two working heads and more particularly the foot bush portions of the nose pieces thereof on opposite sides of intervening fixture held work pieces.

Figures 11, 12:
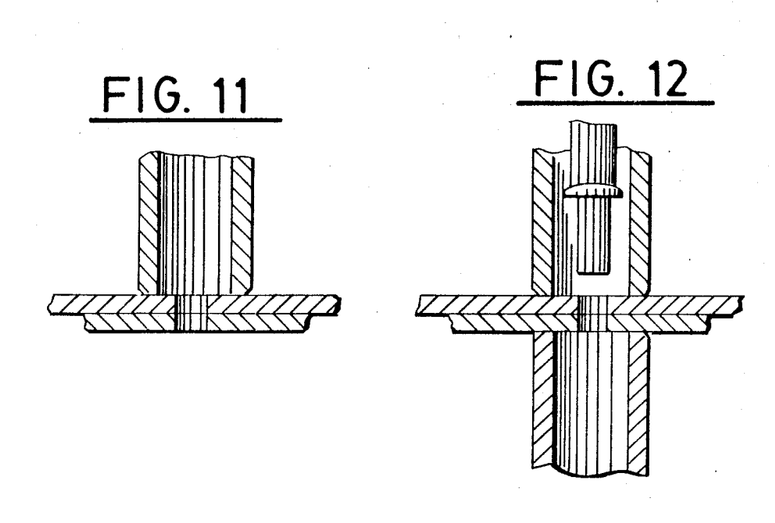

FIG. 11 demonstrates the initial engagement on one side of the assembly parts by the foot bush of the master head with predetermined force as dictated by the sensor means at the outer end of the foot bush and predetermined values for such engagement force as specified by the controlling computer program.

FIG. 12 illustrates the coaxial alignment of the foot bush portions of the master and slave nose pieces on opposite sides o the parts assembly and the clamping engagement of the assembled work parts by the end effector of the slave head with predetermined clamping force. Note that a rivet has been fed in advance of a hammer tool carried by the master head.

Figure 13:
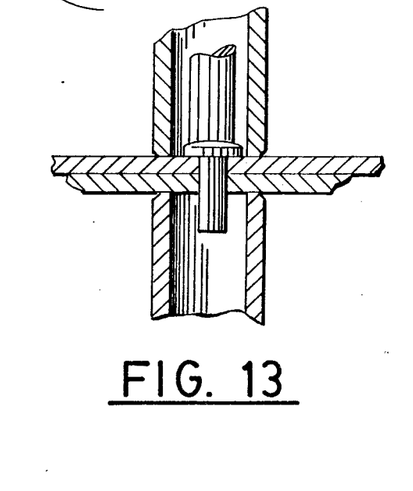

FIG. 13 demonstrates the insertion of the rivet into the previously formed opening by advancing the hammer tool of the master head.

Figures 14, 15:
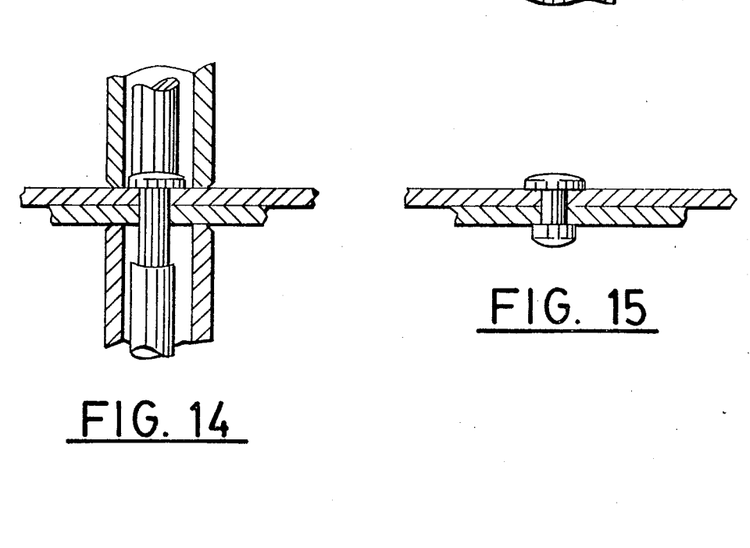

FIG. 14 shows the positioning of the bucking bar tool carried by the slave head in opposing alignment with the hammer tool for upsetting the rivet therebetween; and FIG. 15 demonstrates the completed installation of the rivet after operation of the hammer tool and bucking bar.

It will be appreciated that the schematic illustration of FIGS. 10-15 corresponds to the tooling arrangement set forth in FIG. 9 of the drawings.

In view of the foregoing it is believed that those familiar with the art will readily understand and appreciate the novel advancement presented by this invention and will readily recognize that while the same has been described largely in association with its utilization in the aircraft industry, its teachings and concepts are equally applicable to other fields and areas of operation. Additionally while the invention hereof has been set forth in association with particular tools and working apparatus along with particular preferred and modified embodiments thereof, illustrated in the drawings, it is to be understood that such described embodiments are susceptible to variation, modification and substitution of equivalents without departing from the spirit and scope of the invention which is intended to be unlimited by the foregoing except as may appear in the following appended claims.

The embodiments of the invention in which an exclusive property or privilege is claimed are defined as follows:

1. An end effector attachable to the mobile head of a computer controlled robotic machining center operable to move the mobile head along multiple linear and about multiple rotational axes comprising: a master tool head, a slave tool head, attachment means for connecting said master head to the mobile head of said robotic machining center for multi axis movement with the latter, a substantially U-shaped hollow yoke rigidly fixed at one end to said master head and attached at its other end to said slave head such that the two heads are disposed in coaxial, opposing, spaced relationship; power console means on said attachment means for connecting said master head and slave head to common pneumatic, hydraulic and electrical power supply means carried by the machining center, and plural power driven tool drivers mounted on each said head and adapted to be selectively energized by said power supply means for driving selected tools mounted on said drivers.

2. The end effector of claim 1, wherein each tool head comprises a hollow nose piece having a hollow foot bush at its outer end which is coaxially receptive of tools driven by said tool drivers.

3. The end effector of claim 2, further comprising moveable shuttle means mounted on each said tool head for carrying a plurality of said tool drivers, and means for selectively moving each said shuttle means relative to its respective tool head whereby to selectively position tools carried thereby in coaxial alignment with said foot bush associated therewith; said tool drivers on each tool head passing through lateral openings in the respectively related said nose piece in response to movement of associated said shuttle means.

4. The end effector of claim 3, and power actuated means for axially advancing and retracting each said driver as selected whereby each tool positioned coaxially with a said foot bush may be advanced and retracted coaxially through the latter as selected.

5. The end effector of claim 2, further comprising power actuated means connected to each said nose piece, and means for selectively operating said power actuated means whereby to axially move said nose piece toward and away from the nose piece of the opposing said tool head.

6. The end effector of claim 2, wherein each said nose piece comprises a swivel mounted contact piece at its outer end.

7. The end effector of claim 1, wherein the extent and configuration of said yoke and the spacing of the master and slave heads is such as to accommodate the positioning of stationary work pieces to be assembled between said master and slave heads.

8. The end effector of claim 1, wherein said slave head is pivotally attached to said yoke, and power actuated means for pivotally moving said slave head between an operating position coaxially opposing said master head and a depending, non-operating position; said power actuated means serving to selectively maintain the slave head in such two positions.

9. A multi-task end effector for use with a computer controlled robotic machining center or robot operable to impart multi-axis linear and rotational movements to a mobile head thereof, comprising: a master tool head, a slave tool head, a hollow nose piece movably mounted on each said head, a generally U-shaped yoke means interjoining and rigidly supporting said master head and slave head in opposing, space relationship with the nose pieces thereof in coaxially opposed alignment, means for positively connecting said master tool head directly to the mobile head of the machining center for multi-axis movement of the end effector therewith including console means for commonly connecting the master and slave heads to pneumatic, hydraulic and electrical power sources supplied by the machining center; shuttle means mounted on each said tool head and having means for carrying a plurality of power operated tool drivers adapted to actuate selected tools; power actuator means for selectively moving each said shuttle means transversely of its respectively associated tool head whereby to position selected tool drivers and tools carried thereby in opposing cooperating position coaxially within said nose pieces; said drivers passing through lateral openings in said nose pieces during movement of said shuttle means; power actuated means on each tool head for axially advancing and retracting said nose pieces relative to one another, contact means mounted at the outer end of each said nose piece, said power actuated means serving to engage said contact means with stationary fixture held work pieces disposed between said master and slave heads and to tightly clamp said work pieces therebetween, and sensor means on said contact means for controlling clamping force exerted on said work pieces to predetermined values.

10. The end effector of claim 9, and computer means for controlling operation of said master and slave tool heads and said nose pieces and shuttle means thereof in accordance with a predetermined program and geometry whereby to cause said tool heads to clamp the work pieces together, 11. The end effector of claim 9, and power operated means for axially advancing and retracting each tool driver carried by said master and slave heads, whereby to selectively advance and retract tools carried thereby coaxially of an associated nose piece.

* * * * *

UNITED STATES PATENT AND TRADEMARK OFFICE
CERTIFICATE OF CORRECTION

PATENT NO. : 4,955,119

DATED : 9/11/90

INVENTOR(S) : Giovanni Bonomi & Battistino Oldani

It is certified that error appears in the above-identified patent and that said Letters Patent is hereby corrected as shown below:

Col. 12, line 44, after "together," insert -- form fastener receptive openings at designated locations of said work pieces and install fasteners in said openings for interconnecting said work pieces."

Signed and Sealed this

Twenty-fifth Day of February, 1992

*Attest:*

HARRY F. MANBECK, JR.

*Attesting Officer*      *Commissioner of Patents and Trademarks*